July 3, 1928.
W. S. KNUDSEN
STEERING COLUMN SUPPORT
Filed May 12, 1924
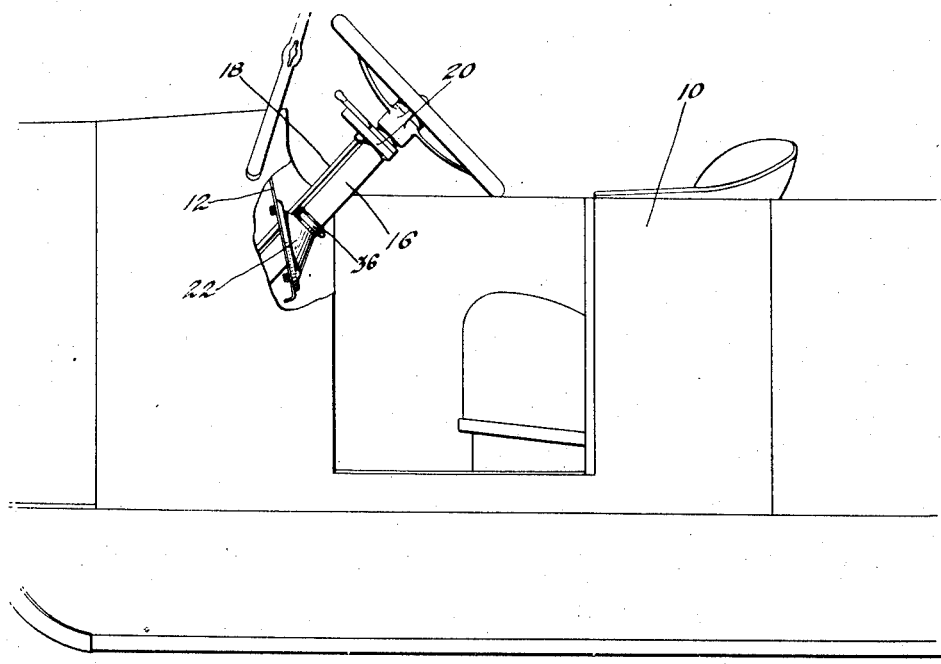
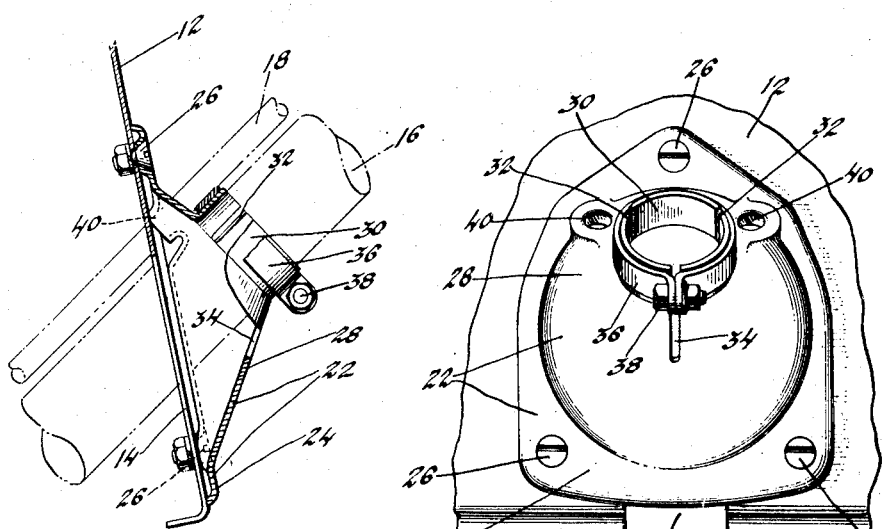
Inventor
William S. Knudsen
By his Attorneys
Blackmore, Spencer & Flint Patented July 3, 1928.

1,675,610

UNITED STATES PATENT OFFICE.

WILLIAM S. KNUDSEN, OF DETROIT, MICHIGAN, ASSIGNOR TO GENERAL MOTORS CORPORATION, OF DETROIT, MICHIGAN, A CORPORATION OF DELAWARE.

STEERING-COLUMN SUPPORT.

Application filed May 12, 1924. Serial No. 712,751.

This invention relates to motor vehicles, and is illustrated as embodied in a Chevrolet automobile having its steering column, and its spark and throttle control rods, supported by a novel sheet metal stamping or bracket, the object being to provide a firm support which is inexpensive to manufacture and assemble in the vehicle.

In one desirable arrangement, the stamping is formed with a split sleeve embracing the steering column and with a flange secured to the dash, and means such as a clamping ring is provided for contracting the sleeve firmly against the steering column. If the spark and throttle controls are arranged outside the steering column, as in the Chevrolet, I prefer to draw the flange of the stamping inwardly to form a pair of perforated bosses in which the spark and throttle control rods are journaled. It will be seen that there is thus provided a firm support which can be stamped out at one operation.

The above and other objects and features of the invention, including various desirable particular constructions, will be apparent from the following description of one illustrative embodiment shown in the accompanying drawings, in which:

Figure 1 is a side elevation of a Chevrolet, partly broken away to show the steering column support;

Figure 2 is a vertical section through the support and the adjacent portion of the dash; and Figure 3 is a rear elevation of the parts shown in Figure 2.

The invention is shown in the drawings embodied in a vehicle comprising a body 10 having a dash 12 slotted upwardly from its bottom at 14 for the steering column 16, so that the steering column may be swung upwardly into place, and is thus very quickly assembled in the vehicle. In the particular arrangement shown, the oscillatable spark and throttle control rods 18 are journaled at their upper ends in a bracket 20 carried by the steering column assembly.

The present invention relates to supporting the steering column at the point where it passes through the dash 12. In the very desirable arrangement shown, a sheet metal stamping 22 is formed with a flange 24 with down-turned edges engaging the face of the dash, to which the stamping is firmly secured (over the slot 14) by three small bolts 26. The stamping is also drawn outwardly in a conical portion 28, affording a very strong base with its axis at an acute angle to the flange, this conical portion in turn culminating in a coaxial sleeve 30 embracing the steering column. The sleeve 30 is shown as provided with two short slots 32, and with a longer slot 34 extending into the conical base 28, to afford a limited flexibility in the base. The sleeve 30 is contracted firmly against the steering column by means such as a split clamping ring 36 operated by a clamping bolt 38.

Preferably the stamping is drawn inwardly on opposite sides of the sleeve 32, to provide a pair of sleeves or perforated bosses 40, in which the spark and throttle control rods 18 are journaled.

While one illustrative embodiment of the invention has been described in detail, it is not my intention to limit its scope to that particular embodiment, or otherwise than by the terms of the appended claims.

I claim:

1. A steering column support in the form of an integral sheet metal stamping having a flange arranged to engage and be secured to a dash, a generally conical base extending therefrom with its axis at an acute angle to the plane of the flange, the base culminating in a co-axial sleeve arranged to embrace and hold a steering column, and the flange being formed with a pair of drawn sleeves or perforated bosses to support the spark and throttle control rods as described.

2. A vehicle comprising, in combination, a body having a dash, a steering column passing through an opening in the dash, a and a clamping ring surrounding the split sleeve embracing the steering column and with a flange secured to the face of the dash, and a clamping ring surrouding the split sleeve and contracting it firmly against the steering column, one or more openings in the bracket adjacent to steering column to receive operating rods.

In testimony whereof I affix my signature.

WILLIAM S. KNUDSEN.